TELEGRAPH TRANSMITTER

Original Filed Oct. 17, 1962 4 Sheets-Sheet 1

INVENTORS
LOUIS C. ANDERSON JR.
ARTHUR A. HAGSTROM
ROLF A. THIENEMANN
BY J. J. Hamill
ATTORNEY

TELEGRAPH TRANSMITTER

Original Filed Oct. 17, 1962 4 Sheets-Sheet 2

INVENTORS
LOUIS C. ANDERSON JR.
ARTHUR A. HAGSTROM
ROLF A. THIENEMANN
BY J. Hamill
ATTORNEY

TELEGRAPH TRANSMITTER

Original Filed Oct. 17, 1962 4 Sheets-Sheet 3

INVENTORS
LOUIS C. ANDERSON JR.
ARTHUR A. HAGSTROM
ROLF A. THIENEMANN
BY J. Hamill
ATTORNEY

TELEGRAPH TRANSMITTER

Original Filed Oct. 17, 1962 4 Sheets-Sheet 4

INVENTORS
LOUIS C. ANDERSON JR.
ARTHUR A. HAGSTROM
ROLF A. THIENEMANN
BY J. J. Hamill
ATTORNEY United States Patent Office Re. 26,008
Reissued Apr. 26, 1966

26,008
TELEGRAPH TRANSMITTER

Louis C. Anderson, Jr., Arlington Heights, Arthur A. Hagstrom, Hoffman Estates, Roselle, and Rolf A. Thienemann, Chicago, Ill., assignors to Teletype Corporation, Skokie, Ill., a corporation of Delaware Original No. 3,150,234, dated Sept. 22, 1964, Ser. No. 231,199, Oct. 17, 1962. Application for reissue Oct. 6, 1965, Ser. No. 493,962
16 Claims. (Cl. 178—17)

Matter enclosed in heavy brackets [ ] appears in the original patent but forms no part of this reissue specification; matter printed in italics indicates the additions made by reissue.

This invention relates to a telegraph transmitter receiving input intelligence from a perforated record medium and furnishing output intelligence as electrical conditions, and more particularly to a telegraph transmitter wherein an electromagnet supplies the entire operating force for the telegraph transmitter.

While there have been prior art electromagnetically driven telegraph transmitters, these transmitters suffered from the deficiency of being massive in size and too expensive since their manner of operation requires a large and powerful magnet to operate them. Since the known electromagnetically driven telegraph transmitters have their sensing pins normally biased by springs to extend through the perforated record medium and feed the record medium prior to sensing, the electromagnet had to exert sufficient force during its initial energization to overcome the combined strength of all the sensing pin biasing springs and the feed pawl spring. Alternatively, in some telegraph transmitters, the sensing pins are held withdrawn by an armature return spring which is of sufficient strength to overcome the combined strength of the individual springs biasing the sensing pins into engagement with the record medium. In this latter type of transmitter, the electromagnet had to be of sufficient strength to overcome this strong armature return spring.

Accordingly, an object of the invention is to provide a new improved inexpensive telegraph transmitter in which the force supplied by an electromagnet is more effectively employed thereby permitting a reduction in the strength of the electromagnet.

Another object of the invention is to provide an electromagnetically driven telegraph transmitter wherein the sensing pins are normally retracted while the electromagnet is de-energized.

A further object of the invention is to provide a magnet driven telegraph transmitter wherein the magnet initially overcomes only a slight load as its armature begins moving toward its pole face after which movement the major sensing pin load may be more readily overcome.

Another object of the invention is to provide an energy storage means effective to store the excessive energy provided by the electromagnet as its armature approaches its pole face and effective to release its energy after the electromagnet is de-energized.

A still further object of the invention is to recover energy that would normally be dissipated as noise and vibration if the armature of the electromagnet were allowed to strike its pole face and to recover some of the excess energy being generated by the electromagnet as it generates energy at a faster rate than it is being utilized.

A still further object is to recover excessive energy generated as the armature approaches its pole face and to recover energy while decelerating a sensing mechanism and to use this energy to feed the record medium and to accelerate the return of the armature and sensing mechanism.

A further object of the invention is to provide a resilient buffer means to minimize the noise and metallic clatter when the sensing pins and armature approach the end of their movements.

A final object of the invention is to provide a tape feeding mechanism wherein only a small force is needed to actuate the feeding mechanism and wherein the increment of tape feed is precisely determined even though the small force is abruptly applied to rapidly accelerate the feed mechanism.

According to the preferred embodiment of the invention, an electromagnet is cyclically energized to provide the force to sense and to feed a perforated tape during each cycle thereof. As the electromagnet is energized, it rotates a pair of attached armature extensions to stretch springs attached thereto to lift sensing pins upwardly to sense the tape. During the initial energization of the electromagnet, the force generated thereby need only be sufficient to overcome a light armature return spring and to accelerate upwardly the armature extensions and sensing pins until the sensing pins engage imperforate portions of the tape. After the armature extensions have moved the sensing pins sufficiently to engage the tape, further movement of the armature stretches those springs whose associated sensing pins engage an imperforate area of the tape and further movement of the armature lifts those sensing pins aligned with a perforation upwardly through the perforations in the tape. As the sensing pins move upwardly through the tape, the armature extensions begin to compress a buffer, or energy storage spring. Since the force generated by the electromagnet is increasing at a faster rate, due to the decreasing air gap, than the load due to the extending of the sensing pin springs, the excessive energy being generated by the electromagnet can be absorbed and stored as potential energy in the buffer spring. Also, the energy storing spring absorbs energy as it decelerates the armature and sensing pins and prevents a sudden stopping thereof with an attendant loss of energy and much noise. Those of the sensing pins extending through the tape close make contacts and thus supply the permutative code combination in the form of a parallel wire output. As the magnet begins to de-energize, the energy storing spring converts the potential energy stored therein to kinetic energy to assist the armature return spring in accelerating the return of the armature extensions and sensing pins and in accelerating a tape feed mechanism to feed the tape forward.

Other features and advantages of the invention will become apparent from the following detailed description when considered in conjunction with the accompanying drawings wherein.

Figure 1:
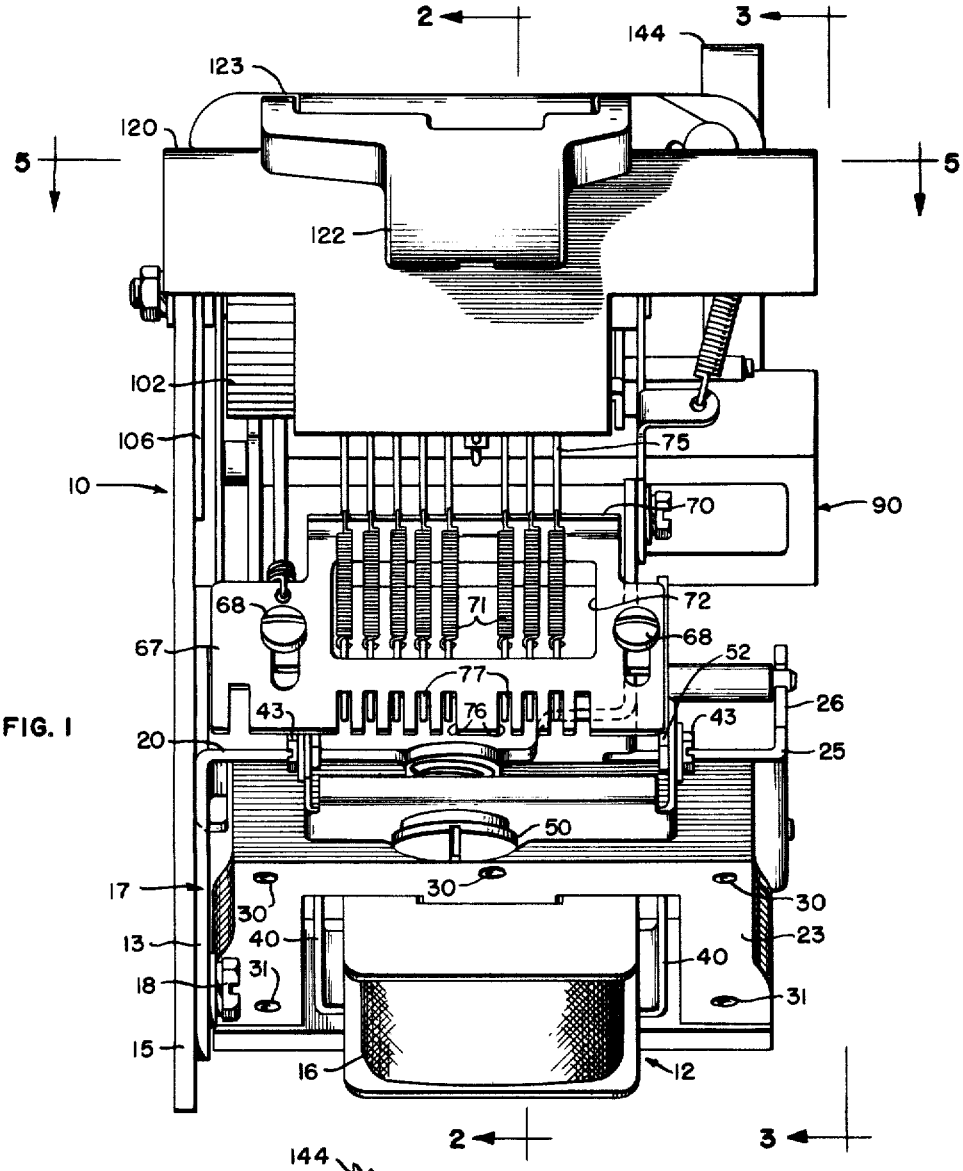
FIGURE 1 is a rear view of the telegraph transmitter according to the preferred embodiment of the invention.

Referring now to the drawings, there is disclosed a telegraph tape transmitter 10 which is adapted for use as a tape sensing and tape feeding device to supply output intelligence to, and to operate in conjunction with, a telegraph page printer mechanism of the type disclosed in the copending application of W. J. Zenner, Serial No. 159,330, filed December 14, 1961. The telegraph transmitter 10 is adapted for attachment by a bracket (not shown) to a portion of the telegraph page printer near the left side of the keyboard 32 shown in the above-identified application.

The telegraph tape transmitter 10 furnishes electrical outputs in parallel form over parallel wires 11 (FIG. 2) rather than in the conventional telegraph serial start-stop form and these outputs are serialized by the distributor 33 of the page printer shown in the copending Zenner application. Thus rather than providing separate distributors for serializing the signals generated by both the tape transmitter 10 and the page printer, the input wires 11 of the tape transmitter 10 are connected to the page printer distributor 33 for serialization thereby.

The telegraph tape transmitter 10, hereinafter described in detail, is employed in the same manner as the tape reader designated by the general numeral 31 in the copending Hagstrom et al. application, Serial No. 159,279, filed December 14, 1961, which application is hereby incorporated by reference as though fully reproduced herein. The electrical connections between that tape reader 31 and distributor 22 are fully set forth in the Hagstrom et al. application. It will suffice for the understanding of the present invention to state that the parallel output wires 11 of the present tape transmitter 10 would be connected to the code segments 21 of the distributor 22 of the Hagstrom et al. application, and that on/off contacts of the present tape transmitter 10 cause the energization and de-energization of a distributor clutch trip magnet 54 to release the distributor clutch 78 thereby driving the distributor 22 to serialize the nonserial output from the present tape transmitter 10. Also, it should be noted that the distributor clutch 78 in the Hagstrom et al. application cyclically operates a contact 74 that would close an energization circuit for the electromagnet 12 of the present tape transmitter to operate the present tape transmitter 10 in timed relationship to the cyclic operation of the distributor 22 shown in the copending Hagstrom et al. application.

While the telegraph tape transmitter 10 is shown herein as employing the distributor mechanism of the telegraph page printer to which it is attached for converting its parallel wire output into a train of sequential marking and spacing pulses having start and stop pulses, it should be apparent that the present tape transmitter 10 can readily be provided with its own distributor for converting its parallel wire output into a train of sequential impulses. Also, since the tape transmitter 10 is connected to the page printer only by electric wires, namely parallel output wires 11, electromagnet energizing wires, and a pair of wires leading from the on/off switch contacts to the distributor clutch trip magnet, it should be apparent that these wires could be of any length and that the tape transmitter could be utilized in a more remote location and be interconnected with the page printer by these wires. The tape transmitter is readily usable as an input device to computers or other types of business machines since the tape transmitter 10 has small dimensions, viz. approximately 4″ x 4″ x 3″ and requires only electrical leads for supplying electrical power to the electromagnet 12 that supplies the force for tape feeding operations and only parallel leads for its output.

Referring now to FIG. 1, it will be seen that the transmitter 10 has a back plate 15 that constitutes the left side of the transmitter and which serves as a main supporting frame member to which all of the posts and other mechanisms are secured. The back plate 15 is a heavy duty member since all mechanisms and posts are cantilevered therein for support and since the back plate 15 serves as the support member for attachment to a bracket (not shown) extending from the page printer.

An electromagnet 12 is provided for supplying the sole operating force for the transmitter, and the electromagnet 12 is supported by a magnet bracket 17 secured to the back plate 15 by a suitable fastener 18 extending through a vertically depending leg 13 of the magnet bracket 17. The magnet bracket 17 is of a fairly complex shape in that it is a one-piece sheet metal bracket formed to provide portions 14 and 26 which extend vertically from a horizontal flange 20, to which flange 20 the laminations 23 of the electromagnet 12 are secured by rivets 30 and 31. As best seen in FIG. 1, the magnet laminations 23 have a general E-shaped configuration surrounding the coil 16 of the electromagnet 12 and the horizontal flange 20 has a hollow interior and a U-shaped configuration surrounding the coil 16 of the electromagnet 12. In addition to being secured by the depending leg 13 to the back plate 15 the magnet bracket is secured at its forward end to the back plate 15 by an additional upwardly extending leg 14 and suitable fastener 19 (FIGS. 2 and 3).

Figure 3:
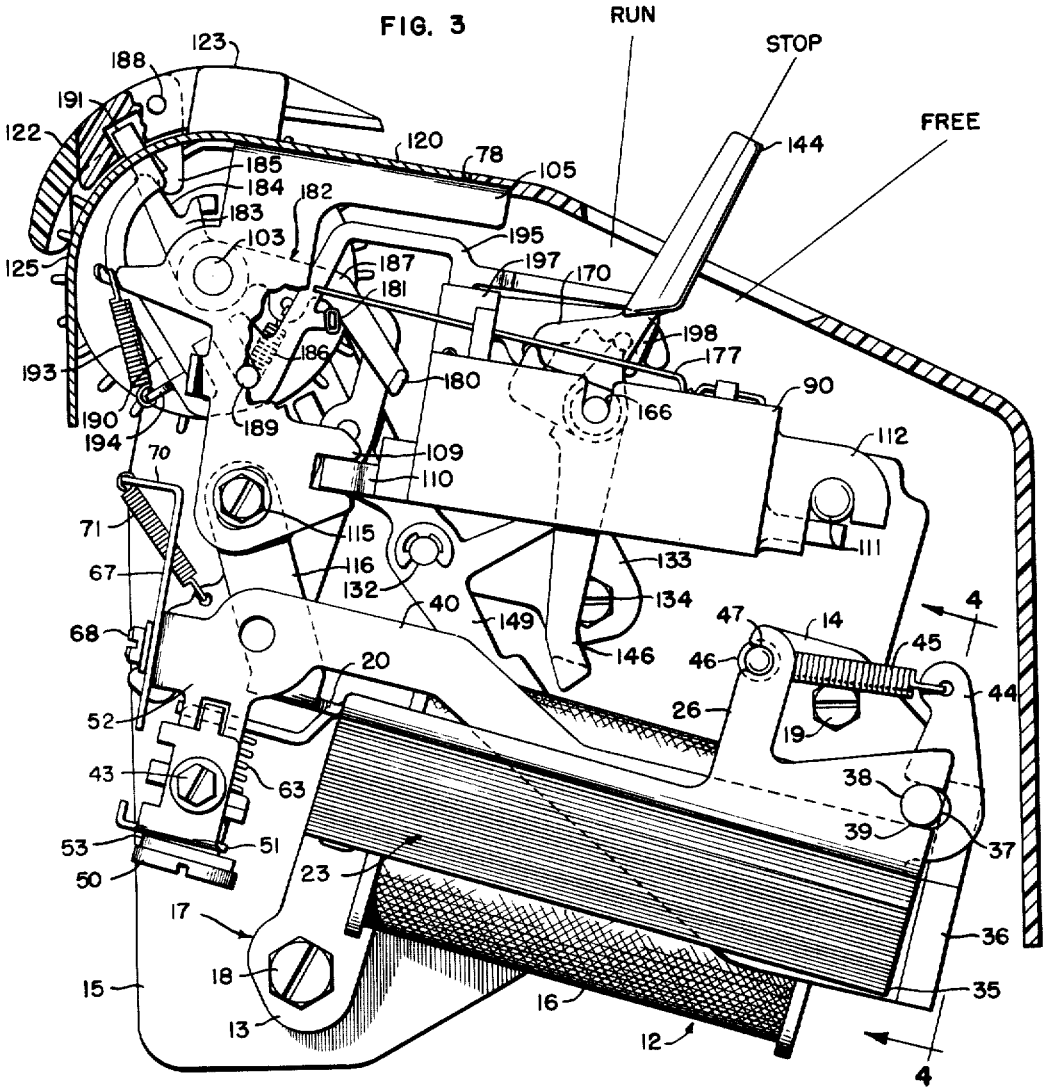
FIG. 3 is a side elevational view taken along the line 3—3 of FIG. 1 in the direction of the arrows to show the electromagnet and its armature extensions.
Figure 4:
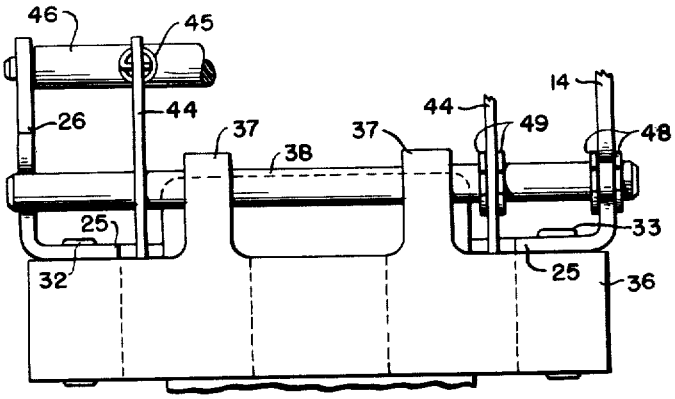
FIG. 4 is an enlarged view taken substantially along the line 4—4 in FIG. 3 in the direction of the arrows to show the supporting pivotal attachment of the armature extensions.

Referring now to FIG. 3, forward ends 35 of the magnet laminations 23 form a pole face 35 for electromagnet 12, toward which pole face an armature 36 will move when the electromagnet 12 is energized. Armature 36 has a pair of upwardly extending finger portions 37 (FIG. 4) that are biased into contact with an armature pivot shaft 38. The finger portions 37 constitute bearing surfaces for the armature 36 as it rotates about shaft 38. The armature pivot shaft 38 is carried in a circular ended slot 39 ground in the upstanding ears 26 of the magnet bracket 17. The circular ended slots 39 are ground in the grinding operation that squares the pole face 35 of the magnet laminations 23, thus assuring a close dimensional tolerance between the depth of a slot 39 and the surface of the pole face 35 of the magnet laminations 23.

Figure 2:
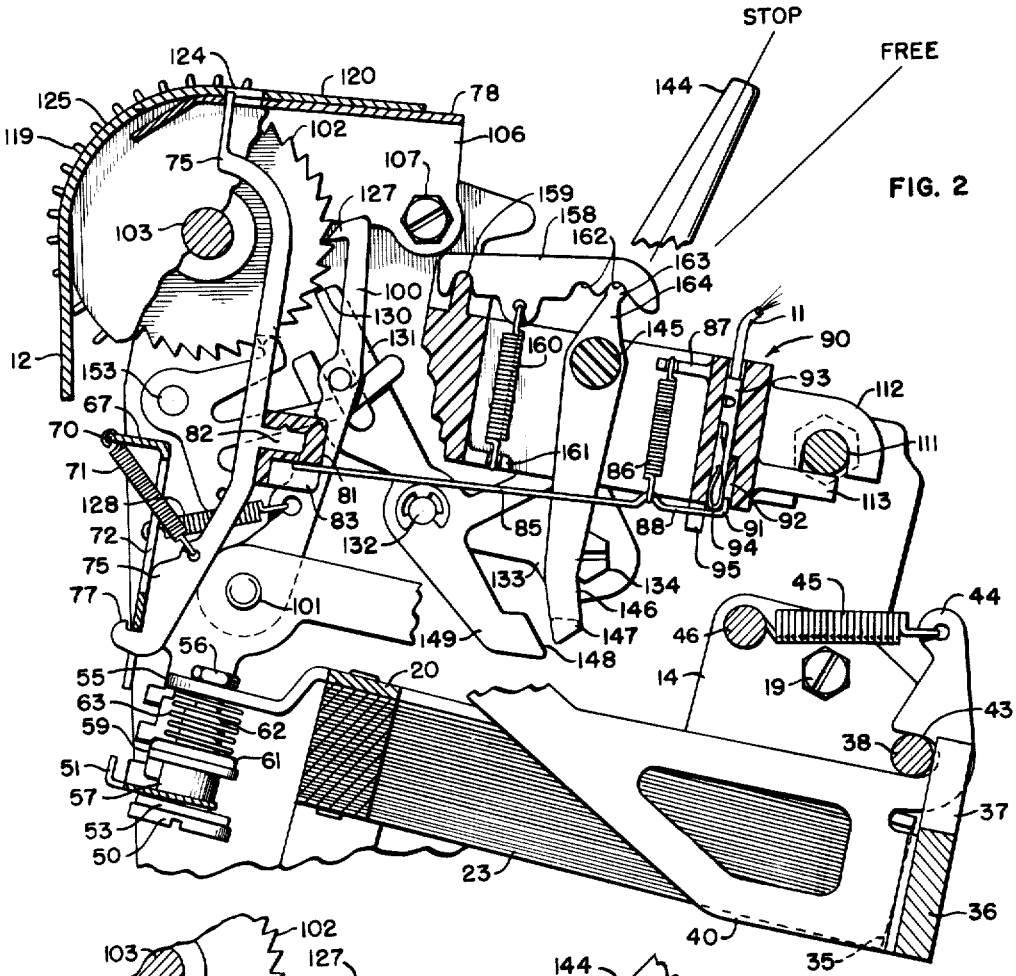
FIG. 2 is a sectional view of the perforator taken along the line 2—2 of FIG. 1 in the direction of the arrows to show the tape sensing pins and the contacts operable thereby.

As best seen in FIG. 2, the armature 36 has spot welded thereto a pair of spaced armature extensions 40. The armature extensions 40 are spaced on each side of the coil 16 of the electromagnet 12 and in the air gap between the magnet laminations 23 and coil 16. The armature extensions 40 have vertically extending fingers 44 having elongated slots 43 for receiving the amature pivot shaft 38. Upper ends of the vertically extending fingers 44 of the armature extensions 40 are hooked to a pair of armature return springs 45 which urge the armature extensions 40 leftward and bias the finger portions 37 of the armature into engagement with the armature pivot shaft 38 thereby limiting the rearward movement of the armature extensions 40 along the shaft 38. The opposite ends of the armature return springs 45 are attached to a shaft 46 carried in slots 47 (FIG. 3) in the upturned ears 26 of the magnet bracket 17.

With the above armature arrangement, the usual adjustments necessary for aligning the armature relative to the pole face of the magnet have been eliminated due to the fact that only two small tolerances are involved and due to the fact that these tolerances can be easily attained and maintained. The first tolerance is the depth of the ground slot 38 relative to the pole face 35, which tolerance, is easily maintained since the slot 38 and pole face 35 are ground in the same operation, as previously described. The other tolerance is the diameter of the armature pivot shaft 38 relative to the contacting surface of the vertically extending fingers 37. It should be noted that the armature 36 pivots about the armature pivot shaft 38 and that the vertically extending fingers 37 are of substantial width thereby affording a wide bearing surface helping to reduce the amount of wear.

The armature return springs 45 serve to hold the shafts 38 and 46 within their respective slots 39 and 47 and to hold the upwardly extending finger 37 in bearing engagement with the armature pivot shaft 38. The holding together of these elements by the springs 45 affords ready assembly and disassembly of the armature unit and compensates for any play and looseness between elements thereof that might result from wear between elements. To prevent endwise movement of the pivot shaft 38 a pair of snap rings 48 (FIG. 4) encircle the shaft 38 on either side of the bracket 14 and in a similar manner snap rings 49 prevent lateral movement of armature extensions 40.

The armature return spring 45 urge the armature extensions 40 to rotate in the counterclockwise direction as viewed in FIGS. 2 and 3 about the armature pivot shaft 38, and continued rotation of the armature extensions 40 in this direction is blocked by engagement of a bail 51 with a resilient washer 53 carried on a stop member 50. Fasteners 43 secure the bail 51 in proper position relative to dependent arms 52, which extend downwardly from the rearward portions of the armature extensions 40. The stop member 50 has an upper threaded portion that is reduced in diameter and that extends through a hole in flange 55 where it is threaded into a nut 56 thereby securing the stop member 50 to the rearwardly turned flange 55 of the magnet bracket 17. The bail 51 is slotted to surround the cylindrical body 57 of the stop member 50. Thus, during upward and clockwise movement of the armature extensions 40, the bail 51 moves upwardly into engagement with a resilient washer 59 seated on a shoulder 61.

Encircling the reduced threaded portion of the stop member 50 is a plunger member having the shoulder 61 in engagement with the resilient washer 59 and an integral plunger member 62 extending through resilient washer 59 and upwardly from the shoulder 61 but short of the flange 55. A compression spring 63 encircles the reduced upper portion of the stop member 50 and is held in compression between the flange 55 of magnet bracket 17 and the shoulder 61 of the plunger member. As will be brought out more fully hereinafter, upward movement of the bail 51 resulting from the clockwise rotation of the armature extensions 40 about their armature pivot shaft 38 moves the bail 51 upwardly into engagement with resilient washer 59. Further upward movement of the bail 51 causes the plunger member 62 to also slide upwardly along the reduced threaded portion of the stop member 50 thereby compressing the spring 63 and storing energy therein and decelerating the armature extensions 40 and armature 36. The spring 63 is not of sufficient strength to prevent the armature from moving into engagement with the pole face 35, but it is of sufficient strength to substantially decelerate the armature 36 before it moves into engagement with the pole face 35. It should be apparent that the spring 63 stores energy in the form of potential energy that would otherwise be dissipated as noise and metallic clatter during a sudden stopping of the clockwise rotation of the armature 36 and armature extensions 40 without their first being decelerated by the spring 63.

The spring 63 becomes effective after the armature 36 has moved approximately two-thirds of its travel distance to decelerate the armature 36 that has been accelerating towards the pole face 35. During this later portion of its travel the armature 36 is decreasing the air gap and the magnet force is increasing at a faster rate than is the load, i.e. the sensing pin spring load. Hence, excessive energy can be absorbed by the compressed spring 63 which would otherwise be dissipated at the end of the stroke. Also, the resilient washer 59 serves to lessen the noise and vibration encountered during the final upward portion of movement of the armature extensions 40 and sensing pins 75.

As best seen in FIG. 3 the armature extensions 40 have a spring hanger 67 fastened thereto by screw fasteners 68 extending into the inwardly turned ears which are formed on the rearward ends of the armature extensions 40. As seen in FIGS. 1 and 2, the spring hanger 67 has a flange 70 to which are hooked a plurality of contractile springs 71 that extend from the flange 70 rightwardly and downwardly at an oblique angle through an opening 72 in the spring hanger 67 and that have their opposite ends hooked into the sensing pins 75.

The spring hanger 67 serves as a sensing pin guiding means in that the bottom portion thereof is slotted into a comb-like arrangement to provide a plurality of guiding slots 76 (FIG. 1) for the hooked ends 77 of the sensing pins 75. As seen in FIG. 2, the upper ends of the sensing pins 75 are in engagement with a top plate bracket 78 which prevents the sensing pins from rotating in a counterclockwise direction about their hooked ends 77 under the urging of contractile springs 71. Also, it should be apparent that the contractile springs 71 urge the hooked ends 77 upwardly into engagement with the top of the slots 76 in the spring hanger 67.

As the electromagnet 12 energizes and the armature 36 begins to move in a clockwise direction as seen in FIGS. 2 and 3 about armature pivot shaft 38 and as the armature extensions 40 also rotate therewith about the armature pivot shaft 38, the flange 70 of the spring hanger 67 also begins to move upwardly in a general circular movement about pivot shaft 38 and through contractile springs 71 lifts all of the sensing pins 75 upwardly into engagement with the perforated tape (not shown) resting on the top plate 120. Thus, during the initial energization of the electromagnet 12, the armature 36 begins to move inwardly and to close the air gap between the pole face 35 and the armature 36. During this initial movement of the armature 36 the force provided by the electromagnet 12 is small because of the large air gap between the armature 36 and pole face 35. However, the force needed to move the sensing pins 75 upwardly into engagement with the tape is relatively small since the load is light and consists primarily of relatively light armature return springs 45 and the weight of the armature extensions 40, spring hanger 67, feed pawl 100 and sensing pins 75. It is not until the sensing pins 75 are engaged with imperforate portions of the tape that continued upward movement of the armature extensions 40 picks up the major load, namely, the extending of contractile springs 71 associated with sensing pins 75 engaging an imperforate area of the tape. Of course, those of the sensing pins 75 that move upwardly through a perforation in the tape associated with their level do not stretch their associated springs 71 since the tape is not blocking the concurrent upward movement of the sensing pins 75 and the spring hanger 67.

As the sensing pins 75 move upwardly they carry upwardly their respective insulating blocks 81 (FIG. 2) secured thereto by bayonet extensions 82 integrally formed on each of the sensing pins 75. The insulating block 81 is preferably formed of a cast plastic material and has a slot 83 formed in its lower portion beneath the bayonet extension 82. Metallic contact springs 85 have their end portions inserted into the slots 83 in the insulating blocks 81 and are biased upwardly against the top of the slots 83 by contractile springs 86 hooked between their forward portions 88 and hooks 87 on a contact block 90. The forward portions 88 of the contact springs 85 are bent upwardly to form a hook 91 inserted into a slot 92 formed in the contact block 90. Extending downwardly in the slot 92 are metallic connectors 93, which connectors are mechanically and electrically connected to the ends of parallel output wires 11. The forward portions 88 of the contact springs 85 bear against bent ends 94 of the connectors 93 and pivot about the bent ends 94 as the sensing pins 75 move upwardly. Each of the contact springs 85 is guided between adjacent teeth 95 that form a comb-like arrangement on the bottom portion of the contact block 90.

Figure 6:
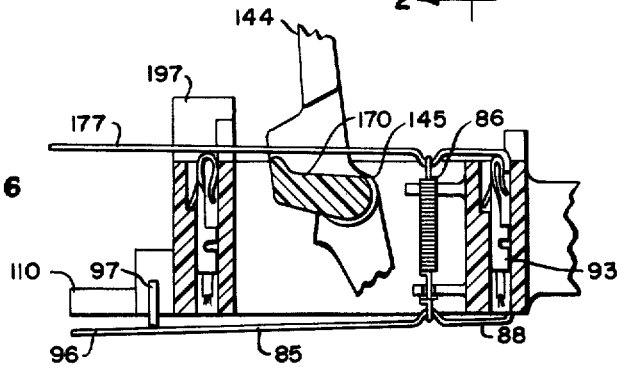
FIG. 6 is an enlarged sectional view of the contact block according to the preferred embodiment of the invention.

As seen in FIG. 6, the rearward portions 96 of the contact springs make electrical contact with a common bar 97 which is secured in the contact block 90 and extends laterally across all of the contact springs 85. For further details of the contact block, reference may be had to copending application of A. A. Hagstrom, Serial No. 159,228 filed December 14, 1961. When a sensing pin 75 moves upwardly through a perforation in the tape, its insulator plug moves upwardly therewith and contractile spring 86 of its associated contact spring 85 causes its rearward end 95 to move into engagement with common bar 97. In this manner contact springs 85 act as "make" contacts to complete an electrical circuit when sensing a perforation in their associated level of the tape.

The sensing pins 75 stay in the upward position for the greater part of the sensing cycle since contact springs 85 must be maintained in their respective positions until the distributor has rotated to complete distribution of their respective signals. As the electromagnet 12 is de-energized, the potential energy stored in spring 63 is now converted to kinetic energy to accelerate the armature extensions 40 downwardly and to cause feed pawl 100 attached by a pin 101 to an armature extension 40 to move downwardly therewith and in so doing to rotate ratchet wheel 102. Ratchet wheel 102 is rotatably mounted on fixed shaft 103 secured in legs 105 and 106 of the inverted U-shaped top plate bracket 78. Fastener 107 (FIG. 2) extends through leg 106 and secures top plate bracket 78 to the back plate 15. Legs 105 and 106 have closely dimensioned openings therein for receiving the feed wheel shaft 103 and thereby accurately locate the feed wheel 102 relative to the top plate bracket 78. The top plate bracket 78 is an important structural member since it also determines the dimensional relationships and tolerances between the contact block 90 and sensing pins 75. As seen in FIG. 3, the leg 105 has a fork 109 for grasping a tab 110 integrally formed on the contact block 90. The orientation of the contact block 90 is determined by the relationship of the tab 110 and the fork 109 since the opposite end of the contact block 90 is rotatably supported on a shaft 111 secured to the back plate 15. A pair of spaced ears 112 formed on the contact block 90 are forced about the shaft 111 to form an interference fit with a central lower tab 113 extending beneath the shaft 111.

The top plate bracket 78 and the magnet bracket 17 are oriented one with another by screw fastener 115 which secures together the depending leg 105 of the top plate brackets 78 and an oblique upward extending arm 116 (FIG. 3) of the magnet bracket 17. Thus, from the foregoing it should be apparent that the top plate bracket 78 and the magnet bracket 17 are secured to the back plate 15 and extend outwardly therefrom in cantilever fashion and serve as the major supports for orienting the electromagnet 12, the sensing pins 75, the feeding mechanisms and the contact block 90.

Figure 5:
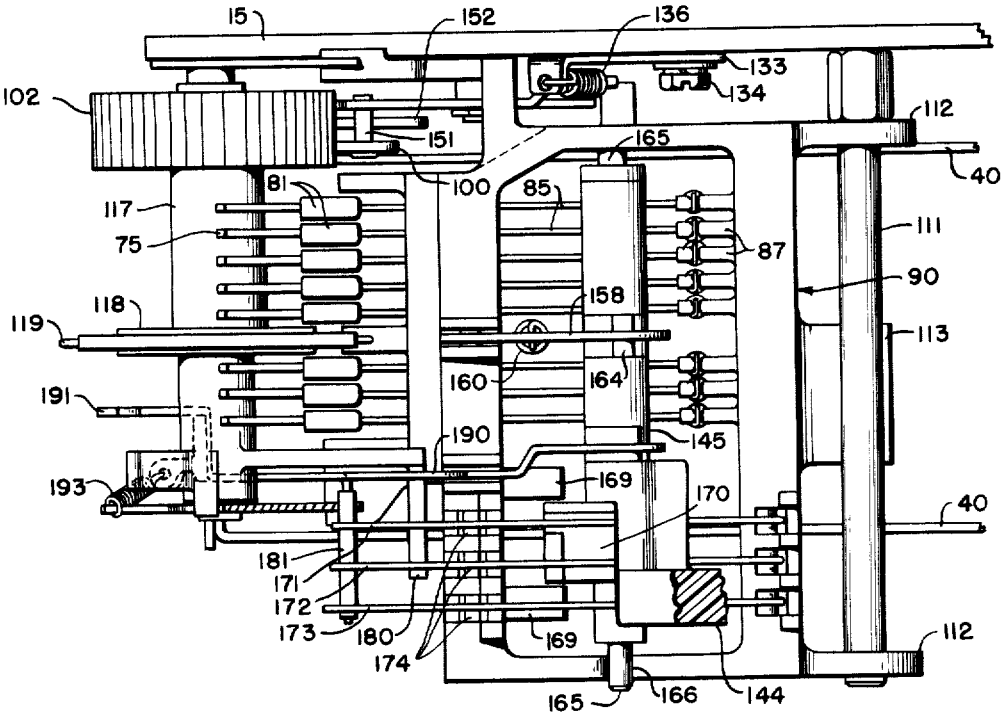
FIG. 5 is a sectional view taken along the line 5—5 of FIG. 1 in the direction of the arrows to show a plan view of the tape transmitter with its top plate removed.

Returning now to FIG. 5 the ratchet wheel 102 shown is of cast plastic construction and has integrally formed thereon an axially extending collar 117. The collar 117 of the ratchet wheel 102 is fastened by a suitable fastener to a feed wheel 118 rotatably mounted on the shaft 103. The feed wheel 118 has feed wheel pins 119 uniformly spaced about its periphery and, as seen in FIG. 2, the feed wheel pins 119 extend outwardly of the top plate 120 through a slot (not shown) in top plate 120.

The top plate 120 serves as the tape bearing plate and supports the perforated tape entering between it and a taut-tape bail 122 and a tape lid 123. The top plate 120 is suitably secured to the top plate bracket by spot welding or other similar means and serves as a dust cover for the feeding and sensing mechanisms of the tape transmitter 10 and provides an additional thickness of plate for guiding the upper extremities of the sensing pins 75. As seen in FIG. 2 the top plate 120 has elongated sensing pin apertures 124 aligned with the elongated apertures in the top plate bracket 78 through which the tape sensing pins 75 move upwardly and also forwardly with the tape if the sensing pins 75 have not been sufficiently retracted to miss being engaged by the tape as it moves. The plate 120 has a curved portion 125 generally configured about the axis of the feed wheel shaft 103 as does the tape lid 123.

The perforated tape when placed on the top plate 120 enters under the taut-tape bail 122 and is wrapped around the curved portion 125 of the top plate 120 so that a plurality of the feed wheel pins 119 are inserted through the feed holes in the perforated tape thereby properly orienting and locating the tape on the top plate 120 relative to the sensing pins 75 and to the tape lid 123. For a further description of the tape lid and its function and operation references should be made to the copending application of A. A. Hagstrom, Serial No. 231,196 filed on October 17, 1962, the disclosure of which is hereby incorporated by reference.

With the tape properly positioned on the top plate so that the feed wheel pins 119 extend through the feed hole perforations therein, a rotation of the feed wheel 118 will bring the next group of perforations constituting a code combination into alignment with the sensing pins 75. The tape feeding operation begins with the raked tooth 127 (FIG. 2) of the feed pawl 100 sliding upwardly against the rear surface of the next upward tooth of the wheel 102 during the upward movement of the armature extensions 40 and the snapping of the raked tooth 127 into engagement with the next tooth of the ratchet wheel 102 under the urging of a contractile spring 128 hooked between the feed pawl 100 and the spring hanger 67. During the downward movement of the feed pawl 100 under the force of the compressed spring 63 and the armature return springs 45, a blocking face 130 of a blocking pawl 131 is presented for blocking engagement with a tooth of the ratched wheel to limit overtravel to a minute amount of rotation of the ratchet wheel 102. The blocking pawl 131 is pivotally mounted on a pivot pin 132 of a bracket 133 secured by fastener 134 to back plate 15. Attached between an ear 135 of the blocking pawl 131 and the bracket 133 is a contractile spring 136 (FIG. 7) tending to pivot blocking pawl 131 into position to present its blocking face 130 for engagement with a tooth on the ratchet wheel 102.

The blocking pawl 131 prevents excessive rotation of the feed wheel 102 due to the overtravel by the feed pawl 100 and inertia of the feed wheel 102. A detent 140 carried by bell crank 139 acts to accurately determine an increment of rotation by centering two adjacent teeth of ratchet wheel 102 accurately about detent 140. The detent spring 141 is sufficiently strong to cause the ratchet wheel 102 to move in either of the two rotatable directions to center the teeth on the rounded detent 140 thereby centering and assuring a uniform feeding operation.

Figure 7:
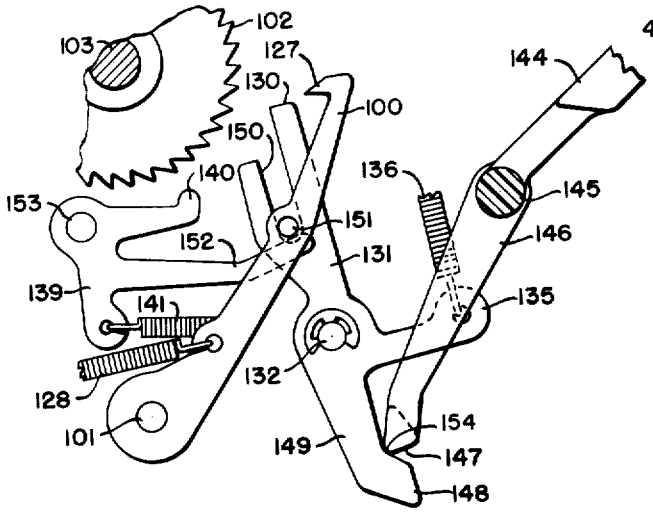
FIG. 7 is an enlarged fragmentary view showing a feed wheel ratchet and pawls therefor being held in a free wheeling position by a start-stop lever.

To permit a free wheeling operation, it is necessary to move the raked tooth 127, the blocking face 130 and the detent 140 from engagement with the teeth of the ratchet wheel 102 and position them in the position shown in FIG. 7. When a stop-start lever 144 is rotated in a clockwise direction, it rotates its integrally formed shaft 145 in the same direction and a downward extension 146 secured to shaft 145 moves its lower extremity 147 into camming engagement with an inclined surface 148 on arm 149 of the blocking pawl 131. As the extremity 147 cams against the inclined surface 148, the blocking pawl 131 rotates in a clockwise direction (FIG. 7) about its pivot pin 132 against the bias of its spring 136 and a forked portion 150 of the blocking pawl 131 rotates about pivot pin 132 and cams against pin 151 secured to feed pawl 100. The pin 151 also extends laterally a sufficient distance to engage an extending arm 152 of bell crank 139 and pin 151 is thus able to cam this bell crank 139 in a clockwise direction about its pivot pin 153 secured in bracket 133. When the start-stop lever 144 has moved a sufficient distance in the clockwise direction, the extremity 147 on downward extension 146 will have moved into a notch 154 on the blocking pawl 131 thereby detenting the start-stop lever 144 in the free wheeling position.

The start-stop lever 144 is of one piece plastic construction and is normally detented in either a start or a stop position by a detent lever 158 rotatably mounted on a laterally extending circular protrusion 159 formed on contact block 90. The detent lever 158 is spring biased downwardly by a spring 160 connected to a hook 161 on contact block 90. Detent lever 158 has a pair of detent notches 162 for detenting engagement with detent 163 on crank arm 164 secured to the shaft 145. As is apparent from FIG. 5, the crank arm 164 is laterally offset on the shaft 145 from the start and stop lever 144. From FIGS. 3 and 5 it will be observed that shaft 145 terminates in a pair of reduced pivot pin cylinders 165 which are supported in slots 166 in the contact block 90. Lateral movement of the shaft 145 is restricted by a pair of spaced projections 169 between which projections rotates a rearwardly extending contact arm 170 of the shaft 145.

The contact arm 170 extends beneath three contact springs 171, 172, and 173. It should be noted that the contact springs 171, 172 and 173 are of the same type of construction as are the contact springs 85 associated with the sensing pins 75, the principal difference being that the contact springs 171, 172 and 173 are disposed on the upper portion of the contact block whereas the contact springs 85 are disposed on the bottom portion of the contact block 90. The contact springs 171 and 173 are not utilized in presently described on-off type of operation wherein the detent lever 158 detents the stop-start lever 144 in either "on" or "off" position, but are employed when using a detent lever that returns the stop-start lever to a neutral position allowing only momentary closure of any of the contact springs. The contact spring 172 functions with its associated contact connector 174 to constitute a make contact in the energization circuit for the distributor clutch trip magnet which in turn controls the energization circuit of the electromagnet 12. Hence, with the start-stop lever 144 in either its stop or free wheeling position, this contact spring 172 will be litfed from engagement with its contact connector 174 and the energizing circuits for the distributor clutch trip magnet and the electromagnet 12 will be opened, and conversely, when the start-stop lever 144 is in the "on" position this contact will engage its contact connector 174 and prepare the energization circuit for these magnets.

To stop the operation of the reader when the tape has become taut, or alternatively, when no tape is present to be sensed, a taut-tape contact arm 180 and a tape-out contact arm 181 are positioned beneath the contact spring 172 to lift it from engagement with its contact connector 174 thereby breaking electrical circuits to the distributor magnet and the electromagnet 12.

The taut-tape bail 122 actuates its taut-tape contact arm 180 to lift the spring contact 172 from engagement with contact connector 174 through a taut-tape lever 182 (FIG. 3) rotatably mounted on feed wheel shaft 103. Taut-tape lever 182 has an upwardly extending finger 183 having a cam surface 184 thereon urged into engagement with a depending lever portion 185 on taut-tape bail 122 by a contractile spring 186 hooked between lever arm 187 on the taut-tape lever 182 and a pin on depending frame member 105.

The taut-tape bail 122 will normally be in a substantially concentric relationship to the curved portion 125 of the top plate 120 when the perforated tape is untensioned and passing easily through the tape reader; however, when the tape does not feed easily in the forward direction, tension is produced in the perforated tape and the tape will straighten and pivot the taut-tape bail 122 in the clockwise direction (FIG. 3) about its pivotal connection 188 with the tape lid 123. As the taut-tape bail 122 rotates, its depending lever portion 185 moves along the cam surface 184 on the taut-tape lever 182 to pivot the taut-tape lever 182 in a counterclockwise direction about shaft 103 thereby lifting the contact arm 180 into engagement with the contact spring 172 to lift it from engagement with its contact connector 174 to break the circuit to the distributor clutch trip magnet.

Figure 8:
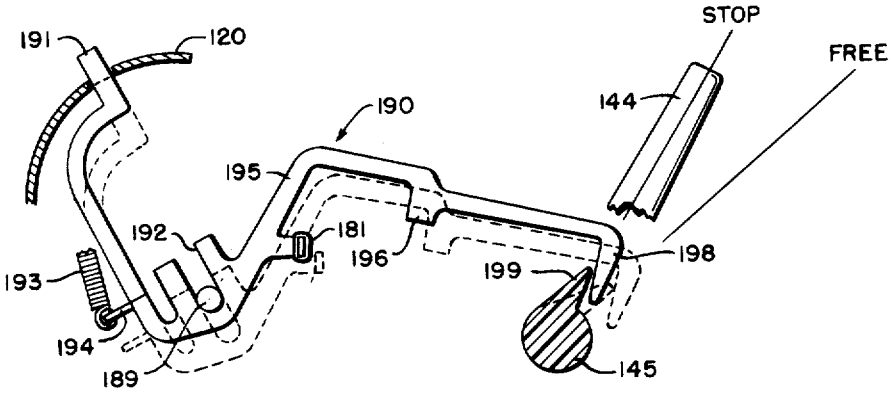
FIG. 8 is an enlarged view showing the position of a tape-out sensing pin when a start-stop lever is in its stop and free wheeling positions.

To detect the presence or absence of a perforated tape passing through the reader, a tape-out sensing lever 190 (FIG. 8) is provided and has formed on its upper end a sensing pin 191 which extends upwardly through an aperture in the top plate 120 and into a cavity in the tape lid 123 (FIG. 3). The tape-out sensing lever 190 has a slot 192 therein biased by a spring 193 into encircling a portion of a pin 189 secured to ear 105 of top plate bracket 78. The spring 193 is connected between the hook on ear 105 and a tab 194 on tape-out sensing lever 190. In the full line position shown in FIG. 8, the tape-out sensing lever 190 is in its uppermost position with its sensing pin 191 extending upwardly into the cavity in the tape lid 123 and its contact arm 181 is in its uppermost position lifting contact spring 172 from engagement with its contact connector 174 to break the energizing circuit for the distributor clutch trip magnet. When a tape is placed on the top plate 120 and the tape lid 123 is closed, the tape depresses the sensing pin 191 beneath the surface of the top plate 120 and the tape-out sensing lever 190 moves obliquely downwardly and rightwardly to the dotted line position of FIG. 8 and is guided during this movement by slot 192 sliding along pin 189. As the tape-out sensing lever 190 moves downwardly, its contact arm 181 also moves downwardly thereby permitting contact spring 172 to move into engagement with its contact connector 174 to complete the energizing circuit for the distributor clutch trip magnet.

The tape sensing lever has an upwardly and forwardly extending arm 195 having a depending portion 196 guided between a pair of walls 197 on the contact block 90. The arm 195 terminates in an inwardly bent hook 198 that is hooked and moved to its dotted line position by an offset portion 199 on the start-stop lever shaft 145 as this shaft 145 is rotated to the free-wheeling position by rotation of the start-stop lever 144 in the clockwise direction. Thus, the sensing pin 191 is lowered beneath the top surface of top plate 120 thereby permitting the tape to be free of the drag of the sensing pin 191 as it is pulled through transmitter 10 by an operator.

To aid in the understanding of the present device, its operation will be described briefly hereinafter.

When the start-stop lever 144 is pivoted to the run position, its contact arm 170 lowers contact spring 172 into engagement with contact connector 174 to complete an energizing path for the distributor clutch trip magnet (not shown) in the page printer in the aforementioned Zenner application and causes the distributor clutch to be released whereupon the distributor clutch shaft closes a contact (not shown) to complete an energization circuit for electromagnet 12.

As the electromagnet 12 energizes, its armature 36 begins to rotate in a clockwise direction as seen in FIGS. 2 and 3 about armature pivot shaft 38. The initial movement of the armature 36 overcomes the light load of the armature return springs 45 and the light load encountered in accelerating armature extensions 40, feed pawl 100, spring hanger 67 and sensing pins 75. During this initial acceleration of the armature extensions 40 and sensing pins 75, the sensing pins 75 are moved to remove the slack or play between the tape and tape lid 120.

As the armature 36 moves closer to the pole face 35, the air gap therebetween is decreasing and the amount of force being provided by the electromagnet 12 is rapidly increasing and is now of sufficient strength to stretch all of the springs 71. As the armature 36 continues to move toward the pole face 35, armature extensions 40 and attached spring hanger 67 move upwardly and stretch those springs 71 associated with the sensing pins 75 that are remaining stationary and are in contact with an imperforate portion of the tape. Those of the sensing pins 75 aligned with a perforation in the tape move upwardly through these perforations and do not stretch their associated springs 75. The latter mentioned sensing pins 75 continue to move upwardly with the spring hanger 67 and armature extensions 40 until the end portions of these sensing pins extend completely through their respective perforations.

Those of the sensing pins 75 moving upwardly through the tape carry their insulated blocks 81 upwardly therewith and the contact springs 85 resting in the slots 83 of their respective insulating blocks 81 follow them upwardly under the bias of their individual springs 86 until the contact springs 85 move into engagement with the common bar 97 thereby completing an electrical circuit through the common bar 97, contact springs 85, contact connectors 93, and parallel wire output leads 11. Of course, those of the sensing pins whose upward travel is obstructed by an imperforate portion of the tape hold their contact springs 85 in spaced relationship to the common bar 97 thereby holding open a path through their contact springs to their respective output leads 11.

During approximately the final one-third of the upper movement of the armature extensions 40 and sensing pins 75, the bail 51 attached to the armature extensions 40 is in engagement with the resilient washer 59 carried on the reduced portion of the stop member 50 and moves the plastic plunger member 62 upwardly along the reduced portion of the stop member 50 thereby compressing the compression spring 63 seated between plunger member 62 and the flange 55 of the magnet bracket 17. Since the force provided by the electromagnet 12 is increasing at a faster rate than the load is being increased due to the stretching of the springs 71 during the terminal movement of the armature 36 toward the pole face 35, some of the excessive energy being provided can be recaptured and stored in the form of potential energy within the spring 63. The spring 63 decelerates the armature 36 sufficiently so that it moves into engagement with the pole face 35 at a lower velocity and thereby reduces the amount of energy that would be dissipated at metallic clatter and vibration if the armature 36 were allowed to suddenly decelerate at the end of its upward movement.

The distributor mechanism of the page printer is now cycling and distributing as sequential output the parallel input from the leads 11 of the tape transmitter 10 and, near the end of the distributor cycle, the distributor clutch operates a contact to open the energization path of electromagnet 12 thereby de-energizing the electromagnet 12. After de-energization of the electromagnet 12, compression spring 63 and armature return springs 45 accelerate the sensing pins 75 and armature extensions 40 downwardly and accelerate the tape feed pawl 100 downwardly to move the tape forward.

The tape feeding operation began with the feed pawl 100 moving upwardly with the armature extensions 40 and the sliding of raked tooth 127 upwardly against the back of the next higher tooth on ratchet wheel 102. During this upward movement of the feed pawl 100, its pin 151 moves upwardly and rightwardly within the forked portion 150 on blocking pawl 131 and cams the blocking pawl 131 in a clockwise direction about its pivot shaft 132 to move it out of the path of movement of the ratchet wheel 102. During the initial downward movement of the armature extensions 40, raked tooth 127 moves into engagement with the next higher tooth on the ratchet wheel 102 and through its pin 151 begins to move blocking pawl 131 in a counterclockwise direction to present its blocking face 130 into the path of movement of a tooth on the ratchet wheel 102. During downward movement of the feed pawl 100, the ratchet wheel 102 is rotated one tooth increment and the face of the next tooth on the ratchet wheel 102 moves into positive contact with the blocking face 130 of the blocking pawl 131. Downward movement of the feed pawl 100 is limited by engagement of bail 51 with the resilient downstop washer 53. The blocking face 130 of the pawl 131 is needed to prevent overthrow, i.e., excessive travel of the ratchet wheel 102 caused by the rapid acceleration and downward movement of the feed pawl 100 and inertia of the ratchet wheel 102.

The detent 140 centers itself between adjacent teeth of the ratchet wheel 102 and thereby assures that the amount of ratchet wheel rotation is equal to the distance between feed wheel pins 119 on feed wheel 118. With the ratchet wheel 102 properly centered by the detent 140, the blocking face 130 of blocking pawl 131 is slightly spaced from the face of the ratchet wheel teeth adjacent thereto.

Simultaneously with downward movement of the feed pawl 100, armature extensions 40 also are moving downwardly the spring hanger 67 which engages the hooks 77 on sensing pins 75 and pulls them downwardly to their lower retracted position. During the terminal portion of the return movement of the armature extensions 40, bail 51 moves into engagement with the resilient washer 53 thereby dampening return noise caused by the deceleration of the sensing mechanism. The electromagnet 12 is now awaiting energization to begin the next cycle of operation.

From the foregoing, it is believed to be apparent that the electromagnet 12 can be of smaller force than that utilized in prior art devices since it needs overcome the weight of a few lightweight elements and the pull of the light armature return springs 45. The armature return springs 45 need not be of sufficient force to overcome the combined force of the sensing pin springs 71 as is the case with some prior art devices.

Also, it should be apparent that the upward stretching of the sensing pin springs 71 during movement of armature extensions 40 allows the sensing pins to be fully retracted in the normal unoperated state of electromagnet 12, thereby affording ease of access for placing tape on the perforator and for permitting the free wheeling of tape through the device while the magnet is de-energized.

Finally, it should be apparent from the foregoing that excessive energy generated during the terminal movement of the armature 36 toward the pole face 35 is absorbed by compression spring 63 and is stored as potential energy for release as kinetic energy to accelerate the return of the sensing mechanism and to assist in the feeding operation. Also, the resilient washers 53 and 59 together with the spring 63 function as a buffer device to absorb energy that would otherwise be dissipated as noise and metallic clatter during the stopping and abrupt deceleration of the sensing mechanism.

Although only one embodiment of the invention is shown in the drawings and described in the foregoing specification, it will be understood that this invention is not limited to the specific embodiment described but is capable of modification and rearrangement and substitution of parts and elements without departing from the spirit of the invention.

What is claimed is:

1. Telegraph transmitter for sensing and feeding a perforated tape having intelligence encoded therein, said transmitter comprising, (a) an electromagnet selectively energizable, (b) a sensing mechanism having normally retracted sensing pins movable by said electromagnet to sense perforations or the lack thereof in said tape, (c) a tape feeding mechanism for feeding the tape forward after each sensing operation by said sensing pins, and (d) an energy storing means operated by said sensing mechanism during the terminal portion of movement of the sensing mechanism toward the tape to decelerate the sensing mechanism by absorbing energy during the deceleration of the sensing mechanism, said energy storing means releasing its energy to assist in accelerating the return of the sensing mechanism and pins and in the accelerating of said tape feeding mechanism to feed the tape.

2. In a telegraph transmitter for sensing and feeding a perforated tape having intelligence encoded therein in the form of perforations, said transmitter furnishing an output representative of said intelligence, said transmitter comprising, (a) normally retracted sensing pins movable into sensing engagement with the perforated tape to sense the perforations in said tape, (b) contact means movable by said sensing pins in response to movement of said sensing pins, (c) electromagnetic means selectively energizable and, when energized, providing the force to move said sensing pins into sensing engagement with the tape, and (d) a normally ineffective buffer means effective during the terminal portion of movement of the sensing pins toward the tape for decelerating the sensing pins by storing energy therein which energy would otherwise be dissipated as noise and vibration, said buffer means employing said energy to accelerate the return of said sensing pins to a retracted position.

3. A telegraph transmitter for sensing combinations of perforations in a recording medium and providing output conditions representative thereof, said telegraph transmitter comprising, (a) magnetizable means selectively energized during the sensing of each combination, (b) armature means movable by said magnetizable means during the energization thereof, (c) sensing means for sensing perforations in the tape or the lack thereof in said tape, (d) resilient means interconnecting said armature means and said sensing means, movement of said armature means moving said resilient means and urging said sensing means into engagement with said tape whereby those of the sensing means sensing a perforation move through a perforation and those of the sensing means sensing an imperforate area of the tape are held in engagement with the tape, and (e) contact means operable by said sensing means to provide output conditions representative of the combination of perforations in the tape.

4. A telegraph transmitter for sensing combinations of perforations in a recording medium and providing output conditions representative thereof, said telegraph transmitter comprising, (a) magnetizable means selectively energized during the sensing of each combination, (b) armature means movable by said magnetizable means during the energization thereof, (c) sensing means normally retracted from the tape during the de-energization of said magnetizable means, said sensing means being movable to sense perforations or the lack thereof in said tape, (d) resilient means interconnecting said armature means and said sensing means, movement of said armature means moving said resilient means and urging said sensing means into engagement with said tape whereby those of the sensing means sensing a perforation move through the perforation and those of the sensing means sensing an imperforate area of the tape are held in engagement with the tape, and (e) contact means operable by said sensing means to provide output conditions representative of the combination of perforations in the tape.

5. A telegraph transmitter for sensing combinations of perforations in a recording medium and for providing output conditions representative thereof comprising, (a) magnetizable means selectively energized during the sensing of each combination, (b) armature means movable by said magnetizable means during the energization thereof, (c) sensing means for sensing perforations or the lack thereof in said recording medium, (d) resilient means interconnecting said armature means and said sensing means, movement of said armature means stretching said resilient means and urging said sensing means into engagement with said recording medium whereby those of the sensing means sensing a perforation are moved through the medium and whereby those of the sensing means sensing an imperforate area of the medium are held against further movement by the tape, (e) contact means operable by said sensing means to provide output conditions representative of the combination of perforations in the recording medium, (f) a return spring for returning said armature means and said sensing means from the positions to which they were moved by said magnetizable means, and (g) normally ineffective energy storing means effective during the latter portion of movement of said armature means to absorb energy and store the energy in the form of potential energy, said energy storing means converting said potential energy to kinetic energy to accelerate the return of the sensing pins and the armature whereby said magnetizable means may be of less powerful construction.

6. In a telegraph transmitter wherein the input information is in the form of combinations of perforations in a record medium and wherein the output is in the form of a permutational arrangement of closed contacts, (a) a plurality of normally retracted sensing means, each of said sensing means movable from a retracted position into a sensing position wherein those of the sensing means not in alignment with a perforation engage the record medium and those of the sensing means aligned with a perforation sense the perforation in the record medium, (b) an electromagnet providing the force to move said sensing pins from their retracted position into their sensing position and for providing the force to move the sensing pins aligned with perforations through the record medium to close their associate contacts, said electromagnet having a pole face, (c) armature means rotatable by said electromagnet to approach a pole face of said magnet during the energization of said electromagnet, (d) an armature return spring biasing said armature from said pole face, (e) actuating means movable by said armature means, (f) resilient means connecting said sensing pins and said actuating means, said resilient means urging said sensing pins into engagement with the record medium and through the perforations therein as said actuating means is moved by said armature means, and (g) an energy storing means operable by said actuating means during the latter portion of its movement to decelerate said actuating means and said armature means, said energy storing means releasing its energy to accelerate the return of said actuating means and said armature means.

7. In an electromagnetically driven sensing and feeding mechanism for perforated tape wherein an electromagnet supplies the force for a tape sensing a plurality of levels of the tape and for tape feeding operations, (a) a frame member for supporting said electromagnet, (b) an armature rotatably supported on said frame and movable toward a pole face on said electromagnet during the energization thereof, (c) armature extension means movable with said armature, (d) a spring hanger means secured to said armature extension means and movable therewith, (e) a plurality of sensing pins movable into a sensing position to detect the presence or absence of perforations in each level, said sensing pins being normally retracted from engagement with the tape, (f) a plurality of spring means individually secured between said spring hanger means and said sensing pins, said armature extension means moving said hanger means to stretch said springs to lift said sensing pins into engagement with the tape whereby during further movement of said hanger means those of the sensing pins in engagement with an imperforate portion of the tape cause their springs to stretch further and whereby those of the sensing pins aligned with a perforation in the tape move through the perforation, and (g) a plurality of contact means, each associated with a sensing pin and operable by a sensing pin to change the condition of a contact means when the sensing pin senses a perforation.

8. The tape sensing and feeding mechanism of claim 7, wherein an energy storing device is operated by said armature extensions during the terminal portion of the movement of the armature and armature extension means to decelerate said armature and armature extension means to prevent said armature from hitting its pole face without being substantially decelerated.

9. The tape sensing and feeding device of claim 7, wherein there is provided a feeding mechanism for feeding said tape forwardly during the return movement of the armature extension means to bring a succeeding set of perforations into position to be sensed by said sensing pins, an energy storing means operable by said armature extension means during the terminal movement of the armature extension means to store potential energy therein while decelerating said armature and armature extension means, said energy storing means providing a portion of the force required to operate said feed mechanism and to accelerate the return of said armature, armature extension means and sensing pins.

10. In an electromagnetically driven sensing and feeding mechanism for perforated tape wherein an electromagnet supplies the force for tape sensing and tape feeding operations, (a) a frame member for supporting said electromagnet, (b) an armature rotatably supported on said frame and movable toward a pole face on said electromagnet during the energization thereof, (c) armature extension means movable with said armature, (d) a plurality of sensing pins movable into engagement with the perforated tape to detect a permutational arrangement of perforations therein, (e) a spring hanger means secured to said armature extension means and movable therewith, said spring hanger means extending upwardly of a portion of said sensing pins and having a guiding comb to guide a portion of said sensing pins, (f) a plurality of spring means each having one end individually secured to said hanger means and having the other end individually secured to a sensing pin, said spring means biasing said sensing pins into guiding relationship with said guiding comb means on said hanger means, movement of said armature means causing said hanger means to move said one end of the springs secured thereto and thereby through said springs to lift said sensing pins into engagement with the tape, continued movement of said hanger means stretching those spring means having their associated sensing pins in engagement with an imperforate area of the tape and moving those sensing pins sensing a perforation aligned therewith through their respective perforations in the tape, and (g) a contact block unit having a plurality of wire spring contacts therein, each of said wire spring contacts having one end movable by a sensing pin to furnish an output condition indicative of perforation or the absense of a perforation.

11. A telegraph transmitter for sensing and feeding a perforated tape having intelligence encoded therein, said transmitter comprising, (a) an electromagnet selectively energizable, (b) a sensing mechanism having normally retracted sensing pins movable by said electromagnet to sense perforations or the lack thereof in said tape, (c) an energy storing means operable by said sensing mechanism during the terminal portion of movement of the sensing mechanism to effect a sensing operation, (d) and a feeding mechanism for feeding a perforated tape by utilizing energy stored during the sensing operation, said feeding mechanism having a ratchet wheel, a feed pawl, a centering detent and a blocking pawl, said feed pawl being rapidly accelerated by said energy storing means to rotate said feed wheel to feed the tape, said blocking pawl blocking overtravel of said ratchet wheel due to the rapid movement of said feed pawl by said energy storing means, said centering detent operable to center said ratchet wheel to a more precise increment of rotation.

12. A telegraph transmitter for sensing combinations of perforations in a recording medium and providing output conditions representative thereof, said telegraph transmitter comprising, (a) magnetizable means selectively energized during the sensing of each combination, (b) sensing means for sensing perforations in the recording medium or the lack thereof in the recording medium, said sensing means being retracted from sensing engagement with the recording medium and perforations therein while said magnetizable means is de-energized, (c) armature means movable by said magnetizable means upon the energization of said magnetizable means to cause said sensing means to move into sensing engagement with said record medium whereby those of the sensing means detecting a perforation through perforations and those of the sensing means sensing an imperforated area of the recording medium remain in engagement with the tape, and (d) an armature returning means operable upon the de-energization of said magnetizable means to return said armature means and thereby said sensing pins from sensing engagement with the recording medium.

13. In a tape feeding mechanism for perforated tape wherein the force available for feeding the tape is limited and wherein this force is abruptly applied tending to rapidly accelerate the feeding of the tape and cause overtravel of the tape being fed, (a) a rotatable ratchet wheel having a plurality of teeth thereon, (b) a feed pawl for engaging the teeth of said ratchet wheel to rotate said ratchet wheel, (c) means for rapidly accelerating said feed pawl to rotate said ratchet wheel, (d) a blocking pawl movable by said feed pawl into the path of rotation of a tooth on said ratchet wheel to limit the rotation of the ratchet wheel by said feed pawl thereby preventing overtravel of said ratchet wheel due to the rapid accelerative movement of the ratchet wheel, (e) a centering detent means operable to center itself between teeth on the ratchet wheel and to rotate said ratchet wheel until its teeth are centered on said detent means, and (f) a spring means of light strength urging said detent means into engagement with teeth on said ratchet wheel.

*14. In a telegraph apparatus a pawl and ratchet mechanism including:*

*a rotatable ratchet wheel having a plurality of teeth thereon;*

*a feed pawl for engaging the teeth of said ratchet wheel to rotate said ratchet wheel;*

*means including a first spring operable during an initial portion of the feed pawl's movement and a second spring operable during all of the feed pawl's movement for rapidly accelerating said feed pawl to rotate said ratchet wheel;*

*a centering detent means operable to center itself between teeth on the ratchet wheel and to rotate said wheel until its teeth are centered on said detent means; and*

*a spring means of light strength urging said detent means into engagement with teeth on said ratchet wheel.*

*15. A mechanism for operating the pawl of a pawl and ratchet drive including:*

*means for moving the pawl relative to the ratchet and into engagement with a tooth on the ratchet;*

*a first spring for driving the pawl throughout its ratchet advancing movement thereby providing a force for moving the ratchet; and*

*a second spring for aiding the first spring in driving the pawl during an initial portion of its ratchet advancing movement and for disengagement from the pawl thereafter, thereby providing an initial force for overcoming the inertia of the ratchet.*

*16. A mechanism for operating the pawl of a pawl and ratchet drive including:*

*a pawl for advancing the ratchet;*

*an electromagnet;*

*an armature for movement upon energization of the electromagnet to move the pawl relative to the ratchet and into engagement with a next tooth on the ratchet;*

*a first spring for opposing the movement of the armature by the electormagnet and for driving the pawl throughout its ratchet advancing movement thereby providing a force for advancing the ratchet; and*

*a second spring for opposing the movement of the armature by the electromagnet after the armature has completed a substantial portion of said movement and for driving the pawl during an initial portion of its ratchet advancing movement and for disengagement thereafter, thereby providing an initial force for overcoming the inertia of the ratchet.*

References Cited by the Examiner

The following references, cited by the Examiner, are of record in the patented file of this patent or the original patent.

UNITED STATES PATENTS

| | | | |
|---|---|---|---|
| 2,735,888 | 2/1956 | Zenner | 178—17 |
| 3,025,346 | 3/1962 | Arko | 178—17 |

References Cited by the Applicant

UNITED STATES PATENTS

| | | |
|---|---|---|
| 1,466,969 | 9/1923 | Stafford. |
| 2,990,723 | 7/1961 | Holpuch. |

NEIL C. READ, *Primary Examiner.*

T. A. ROBINSON, *Assistant Examiner.*